United States Patent [19]
Okada et al.

[11] Patent Number: 5,969,757
[45] Date of Patent: Oct. 19, 1999

[54] IMAGING APPARATUS AND METHOD HAVING ENHANCED MOIRE REDUCTION

[75] Inventors: Hideo Okada; Tohru Okuda, both of Nara, Japan

[73] Assignee: Sharp Kabushiki Kaisha, Osaka, Japan

[21] Appl. No.: 08/676,042

[22] Filed: Jul. 5, 1996

[30] Foreign Application Priority Data

Jul. 5, 1995 [JP] Japan ................................. 7-170006
Mar. 19, 1996 [JP] Japan ................................. 8-062727

[51] Int. Cl.⁶ ............................. H04N 7/00; H04N 5/217
[52] U.S. Cl. .......................................... 348/219; 348/241
[58] Field of Search .................................. 348/241, 218, 348/219, 607

[56] References Cited

U.S. PATENT DOCUMENTS 5,440,669  8/1995  Rakuljic et al. ............................ 359/7
5,754,226  5/1998  Yamada et al. .......................... 348/219

FOREIGN PATENT DOCUMENTS 60-054576  3/1985  Japan .
63-284980  11/1988  Japan .
1-035550  7/1989  Japan .
3-226078  10/1991  Japan .
3-231589  10/1991  Japan .
4-236585  8/1992  Japan .

*Primary Examiner*—Wendy Garber
*Assistant Examiner*—Jacqueline Wilson

[57] ABSTRACT

An image inputting apparatus which allows inputting of an image with a first resolution and another image with a second resolution higher than the first resolution which is provided by increasing the first resolution by image-shifting means, and which is designed to perform moire removal with minimal power consumption in such a manner that moire-removing means is activated to remove the moire when moire-detecting means judges that a moire is present, whereas the moire-removing means is deactivated when it is judged that no moire is present.

24 Claims, 12 Drawing Sheets

IMAGING APPARATUS AND METHOD HAVING ENHANCED MOIRE REDUCTION

BACKGROUND OF THE INVENTION

1. Field of the Invention

The present invention relates to an image inputting apparatus which uses a solid state imaging device, and more particularly to an improvement in image inputting apparatuses equipped with image shifting mechanisms for taking a plurality of images with different resolutions.

2. Description of the Related Art

Solid state imaging devices such as CCDs have long found widespread application as imaging devices for use in image inputting apparatuses. In principle, resolutions of solid state imaging devices are essentially determined by the number of pixels arranged in the image pickup surfaces. Accordingly, use of more pixels results in higher resolutions. However, some limits presently exist on the increased number of pixels from a technical standpoint and in terms of cost. Some techniques have already been suggested, which allow images to be taken at relatively higher resolutions through the use of solid state imaging devices composed of limited numbers of pixels, such as methods which involve the use of image shifting mechanisms, as disclosed in Japanese Unexamined Patent Publication JP-A 60-54576 (1985). More recently, there also have been suggested image inputting apparatuses equipped with image shifting mechanisms, which are designed to take two or more different images: an image of the resolution increased by image shifting and another image of the resolution characteristic to the CCD used. The related art is also described in, for example, Japanese Unexamined Patent Publication JP-A 3-231589 (1991) and Japanese Unexamined Patent Publication JP-A 3-226078 (1991).

FIG. 17 illustrates an example of the configuration of an image inputting apparatus which allows two images to be taken at different resolutions. Arranged along an optical axis Z are an optical system 1, a refracting plate 2, a spatial filter 3 and a solid state imaging device 4. The refracting plate 2 may be displaced by an actuator such as a piezoelectric device 5, from a position where the surface is perpendicular to the optical axis Z indicated by the solid line to a position where it is tilted with respect to the optical axis Z which is indicated by the broken line. The piezoelectric device 5 is driven by a piezoelectric-device driving circuit 6. Images taken by the solid state imaging device 4 are converted to electric signals which are outputted as image information through an image-processing circuit 7. A control circuit 8 controls the piezoelectric-device driving circuit 6 on the basis of the image information from the image-processing circuit 7 so that the optical axis Z is shifted to the optical path Z' indicated by the broken line by displacement of the refracting plate 2 by the piezoelectric device 5. The amount of this displacement of the optical path by image shifting is set to be half the pixel pitch of the solid state imaging device 4, for example. A detailed explanation of this type of image shifting mechanism is given in Japanese Unexamined Patent Publication JP-A 60-54576 mentioned above.

The image inputting apparatus illustrated in FIG. 17 is designed to input an image with a first resolution, that is, the characteristic resolution (hereunder may be referred to as "normal resolution") determined by the pixel number of the solid state imaging device 4 in cases where image shifting is not performed. The control circuit 8, upon receipt of a signal indicating input mode at the normal resolution from a controller (not shown), instructs the piezoelectric-device driving circuit 6 to suspend its operation to thereby stop the piezoelectric device 5 at a given position. The given position of the piezoelectric device 5 is the one at which the refracting plate 2 is not tilted and thus the optical axis Z is not shifted. The spatial filter 3 serves to cut off high spatial frequency components from an image incident from the subject which have moire-producing (at the next solid state imaging device 4) spatial frequencies over the Nyquist frequency. Output signals of an image incident upon the solid state imaging device 4 undergo A/D conversion, gamma correction, etc. through the image-processing circuit 7, and are obtained as signals of the image with the normal resolution. The image output means is a cathode ray tube (hereunder abbreviated to "CRT") when the image is outputted as a dynamic image, and an image memory or the like when it is outputted as a still image. In either case, the processing technique may be any well known one. Here, "dynamic image" means that which is formed of still images in time-series, typically images taken with video cameras or the like.

An explanation will now be given regarding the operation for inputting an image with a second resolution which is higher than the first resolution (hereunder may be reffered to as "higher resolution") through image shifting. The control circuit 8, upon receipt of a signal indicating a mode for inputting an image with the higher resolution from the controller (not shown), instructs the piezoelectric-device driving circuit 6 to perform an image shifting operation. According to the instructions, the piezoelectric-device driving circuit 6 drives the piezoelectric device 5 to displace the refracting plate 2 alternately to the position indicated by the solid line and to the position indicated by the broken line, and the image shifting operation is performed at the position indicated by the broken line to shift the optical axis Z to the optical path Z'. The image-processing circuit 7 subjects a plurality of images taken via image shifting to A/D conversion, gamma correction, etc., and an image with the second resolution which is higher than the first resolution is synthesized in an image memory. An image synthesis method is described in, for example, Japanese Unexamined Patent Publication JP-A 63-284980 (1988) in detail.

When an image with the normal resolution is inputted, the spatial filter 3 cuts off high spatial frequency components of the inputted image so as to remove a moire due to sampling of the image inputted by the solid state imaging device 4. Japanese Unexamined Patent Publication JP-A 4-236585 (1992) discloses the concept of optical low-pass filtering which enables both moire removal and increase in the resolution by making the transmitting characteristics of the spatial filter 3 variable in such a manner that spatial frequencies which allow transmission through the spatial filter 3 are set to be low when images with the normal resolution are inputted, and high when images with the higher resolution are inputted. Japanese Unexamined Patent Publication JP-A 3-226078 discloses a prior art technique which involves provision of two replaceable types of spatial filters, a low-cutoff spatial filter which is to be used when images with the normal resolution are inputted, and another high-cutoff spatial filter which is to be used when images with the higher resolution are inputted. In addition, Japanese Examined Patent Publication JP-B2 1-35550 (1989) discloses a method in which the spatial filter 3 is not used, and image shifting is utilized to input still images to acquire still images with the higher resolution, whereas when images with the normal resolution are inputted, the refracting plate 2 is vibrated at a high speed to remove moires, and the opening of the solid state imaging device 4 is temporarily extended to acquire images with the normal resolution.

Of the conventional techniques which accomplish both inputting of images with the higher resolution and moire removal, those methods such as the one disclosed in Japanese Unexamined Patent Publication JP-A 4-236585 which depend on the variable transmitting characteristics of the spatial filter 3, have a disadvantage in that the spatial filter 3 requires a complicated configuration, and this results in an increased manufacturing cost. In addition, the prior art techniques employing such a configuration as the one disclosed in Japanese Unexamined Patent Publication JP-A 3-226078 which contains two replaceable types of spatial filters 3, requires a mechanism for switching between the spatial filters 3, and this increases the size of the image inputting apparatus as well as the manufacturing cost. The method in which when a still image is inputted, image shifting is performed without using the spatial filter 3, and the refracting plate 2 is vibrated at a high speed so as to remove a moire when an image with the normal resolution is inputted, requires that the refracting plate 2 be driven at all times even when an image of the subject which does not produce a moire is inputted at the normal resolution, and this of course increases the power consumption; the method is particularly unsuitable when the solid state image inputting device is portable, because it results in accelerated exhaustion of the battery.

SUMMARY OF THE INVENTION

In view of the problems and drawbacks of the prior art described above, it is an object of the present invention to provide an image inputting apparatus which allows production of both images with the normal resolution and images with the higher resolution through the use of a compact and inexpensive configuration, and to provide reduction in power consumption, for application to portable apparatuses. It is another object of the invention to provide an optimal configuration for removing a moire using an image shifting mechanism.

The invention relates to an image inputting apparatus including, an optical system for gathering incident light from the subject; a solid state imaging device; and image-shifting means for shifting the optical path incident upon the solid state imaging device, and capable of acquiring an image with a first resolution determined by the pixel number of the solid state imaging device and an image with a second resolution which is higher than the first resolution and is produced by synthesis of a plurality of images resulting from image shifting by predetermined amounts by the image shifting means, characterized by further comprising:

moire-detecting means for detecting the presence or absence of a moire based on image information which is inputted to the solid state imaging device according to the incident image;

moire-removing means for removing moire-related image information from the incident image; and control means which, in response to an output of the moire-detecting means when an image with a first resolution is inputted, activates or deactivates the moire-removing means based on the presence or absence of a moire.

According to the invention, it is possible to input two types of images, one with a first resolution and the other with a second resolution which is higher than the first resolution, and also to remove a moire using the moire-removing means when the image with a first resolution is inputted. Since no spatial filter is used to remove a moire, an inexpensive image inputting apparatus may be provided. The moire-removing means is activated only when a moire is detected by the moire-detecting means, and this results in lower power consumption.

Also, in the present invention, the image with a first resolution may be characterized as a dynamic image.

According to this feature, when a dynamic image is inputted as the image with a first resolution, moire-related image information is removed by the moire-removing means in cases where the moire-detecting means detects the presence of a moire, and this allows production of a high-quality dynamic image. The image with a second resolution, being synthesized from a plurality of images taken, may be inputted as a still image with a higher resolution, but not as a dynamic image.

Also, in the invention, the moire-detecting means may be characterized by comprising:

comparing means for making a comparison between image information obtained as a result of operation of the moire-removing means and image information obtained as a result of non-operation of the moire-removing means; and judging means which outputs signals indicating the presence of a moire when the difference found by the comparison is larger than a predetermined amount, or the absence of a moire when the difference found by the comparison is smaller than the predetermined amount, in response to an output of the comparing means.

According to this feature, a comparison is made between the two sets of image information which are the results of operation or non-operation of the moire-removing means. A large difference between the two sets of image information reflects production of a moire. Since the presence or absence of a moire is judged by comparison with the predetermined value of difference, it is easy to detect a moire using image information.

Also, in the invention, the moire-detecting means may be characterized by comprising:

comparing means for making a comparison between information of the image with a first resolution and information of the image with a second resolution; and judging means which outputs signals indicating the presence of a moire when the difference found by the comparison is larger than a predetermined amount, or the absence of a moire when the difference found by the comparison is smaller than the predetermined amount, in response to an output of the comparing means.

According to this feature, the presence or absence of a moire is judged by making a comparison between information of the image with a first resolution and information of the image with a second resolution. Since the extent of the moire differs depending on the difference in resolution, large differences may be judged to be indicative of production of moires. Since the judgment is made on the basis of the difference in resolution, moires can be detected electrically in a rapid manner.

Also, in the invention, the comparing means may be characterized by making a comparison between low spatial frequency components after the image with a first resolution is interpolated pixel by pixel to have the same number of pixels as the image with a second resolution.

According to this feature, the pixel-to-pixel comparison with the information with the higher resolution image is made, and the detection of a moire based on the result of summation of the differences is enabled.

Also, in the invention, the moire-detecting means may be characterized by comprising:

high spatial frequency extracting means for extracting high spatial frequency components from information of an image with a second resolution; and judging means which outputs a signal indicating the presence of a moire when the output from the high spatial frequency component extracting means is larger than a predetermined amount, or a signal indicating the absence of a moire when the output is smaller than the predetermined amount.

According to this feature, since a moire is produced when high spatial frequency components having a period less than twice the pixel pitch of the solid state imaging device are contained in the inputted image, a moire in the image with the higher resolution may be easily detected through extraction of the high spatial frequency components.

Also, in the invention, the moire-detecting means may be characterized by processing the image information by fast Fourier transformation(hereunder abbreviated to "FFT") to make a comparison between frequency components.

According to this feature, the extraction of frequency components from the image information is performed through FFT, changing of the frequency band and other operations may be easily performed by digital signal processing, thus facilitating adjustment for moire removal.

Also, in the invention, the moire-detecting means may be characterized by accessing the photographic scene of the image inputting apparatus, and by activating the moire-removing means immediately after switching to another photographic scene.

According to this feature, the effect of suspension of the inputted image during operation of the moire-detecting means can be minimized.

Further, the invention relates to an image inputting apparatus, including an optical system for gathering incident light from the subject; a solid state imaging device; and image-shifting means for shifting the optical path incident upon the solid state imaging device, and capable of acquiring an image with a first resolution determined by the pixel number of the solid state imaging device and an image with a second resolution which is higher than the first resolution and is produced by synthesis of a plurality of images resulting from image shifting by predetermined amounts by the image shifting means, characterized by further comprising:

moving vector-operating means for operating a moving vector based on at least two frames of image information inputted to the solid state imaging device at a predetermined interval;

moire-removing means for removing moire-related image information from the incident image; and control means which, based on the moving vector operated by the moving vector-operating means when the image with a first resolution is inputted, activates the moire-removing means when the moving vector is smaller than a predetermined amount, or deactivates the moire-removing means when the moving vector is larger than the predetermined amount.

According to the invention, the moving vector-operating means operates a moving vector on the basis of at least two frames of image information which is inputted to the solid state imaging device, and the moire-removing means is activated when the operated moving vector is smaller than a predetermined amount, since this indicates that the moire is obtrusive. Conversely, when the moving vector is larger than the predetermined amount, this indicates that the moire is unobtrusive, and thus moire removal is not performed, thereby reducing power consumption.

Still further, the invention relates to an image inputting apparatus, including an optical system for gathering incident light from the subject; a solid state imaging device; and image-shifting means for shifting the optical path incident upon the solid state imaging device, and capable of acquiring an image with a first resolution determined by the pixel number of the solid state imaging device and an image with a second resolution which is higher than the first resolution and is produced by synthesis of a plurality of images resulting from image shifting by predetermined amounts by the image shifting means, characterized by further comprising:

movement-detecting means for detecting the movement of the image inputting apparatus;

moire-removing means for removing moire-related image information from the incident image; and control means which, in response to an output from the movement-detecting means when the image with a first resolution is inputted, activates the moire-removing means when the amount of movement of the image inputting apparatus is smaller than a predetermined amount, or deactivates the moire-removing means when the amount of movement of the image inputting apparatus is larger than the predetermined amount.

According to the invention, the movement-detecting means detects the movement of the image inputting apparatus, and the moire-removing means is activated to accomplish moire removal when the amount of movement is smaller than the predetermined amount, since this indicates that the moire is obtrusive. Since the amount of movement which is larger than the predetermined amount indicates that a moire, if present in the image, is not very obtrusive, the moire-removing means may be deactivated to lower the power consumption. In addition, since no image information is used to determine whether to perform moire removal, the determination may be accomplished without influencing the image information.

Also, in the invention, the image with a first resolution may be characterized as a dynamic image.

According to this feature, when dynamic images are inputted as the image with a first resolution, the moire-removing means can be effectively operated, depending on the degree of the influence by moire, to acquire dynamic images of high quality.

Also, in the invention, the moire-removing means may be characterized by accomplishing moire removal by subjecting the optical path incident upon the solid state imaging device to minute, high-speed vibrations through the use of the image-shifting means to lower the spatial frequency of image equally incident upon the solid state imaging device, and operating the image-shifting means in such a manner that the driving period t' of the image-shifting operation satisfies the relationship: $t'=t/2^n$ wherein t is the storage time of the solid state imaging device, and n is an integer of one or more.

According to this feature, moire removal is accomplished using the image-shifting means. The driving period t' of the image-shifting operation is set to be ($\frac{1}{2}^n$) times the storage time t of the solid state imaging device. This setting may be performed by subjecting the optical path incident upon the solid state imaging device to minute, high-speed vibrations to lower the spatial frequency of image equally incident upon the solid state imaging device.

Also, in the invention, the moire-removing means may be characterized by accomplishing moire removal by subjecting the optical path incident upon the solid state imaging device to minute, high-speed vibrations through the use of the image shifting means to lower the spatial frequency of image equally incident upon the solid state imaging device, and operating the image-shifting means in such a manner that the driving period t' of the image shifting operation satisfies the relationship: $t'=2t/2^n$ wherein t is the storage period of the solid state imaging device, and n is an integer of one or more, and the image shifting operation is reversed once at the halfway stage of the storage time of the solid state imaging device.

According to this feature, moire removal by image shifting due to enlargement of the apparent opening of each pixel of the solid state imaging device can be accomplished effectively and continuously at a duty ratio of 50%, and thus the power consumption required for moire removal can be reduced.

Also, in the invention, the moire-removing means may be characterized by accomplishing moire removal by subjecting the optical path incident upon the solid state imaging device to minute, high-speed vibrations through the use of the image-shifting means to lower the spatial frequency of image equally incident upon the solid state imaging device, and matching the drive frequency of the image-shifting operation to the resonance frequency of the movable section of the image shifting means.

According to this feature, since the image-shifting means is operated in synchronization with the resonance frequency of the movable section of the image shifting means to accomplish moire removal, the power required to drive the image-shifting means is minimized, and this can minimize the power consumption.

Also, in the invention, the moire-removing means may be characterized by operating the image-shifting means in such a manner that the distance of the image shifting is within the range of 0.25–1 times the pixel pitch of the solid state imaging device in the image-shifting direction.

According to this feature, moire removal by the operation of the image-shifting means can be performed reliably without substantially influencing the resolution.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
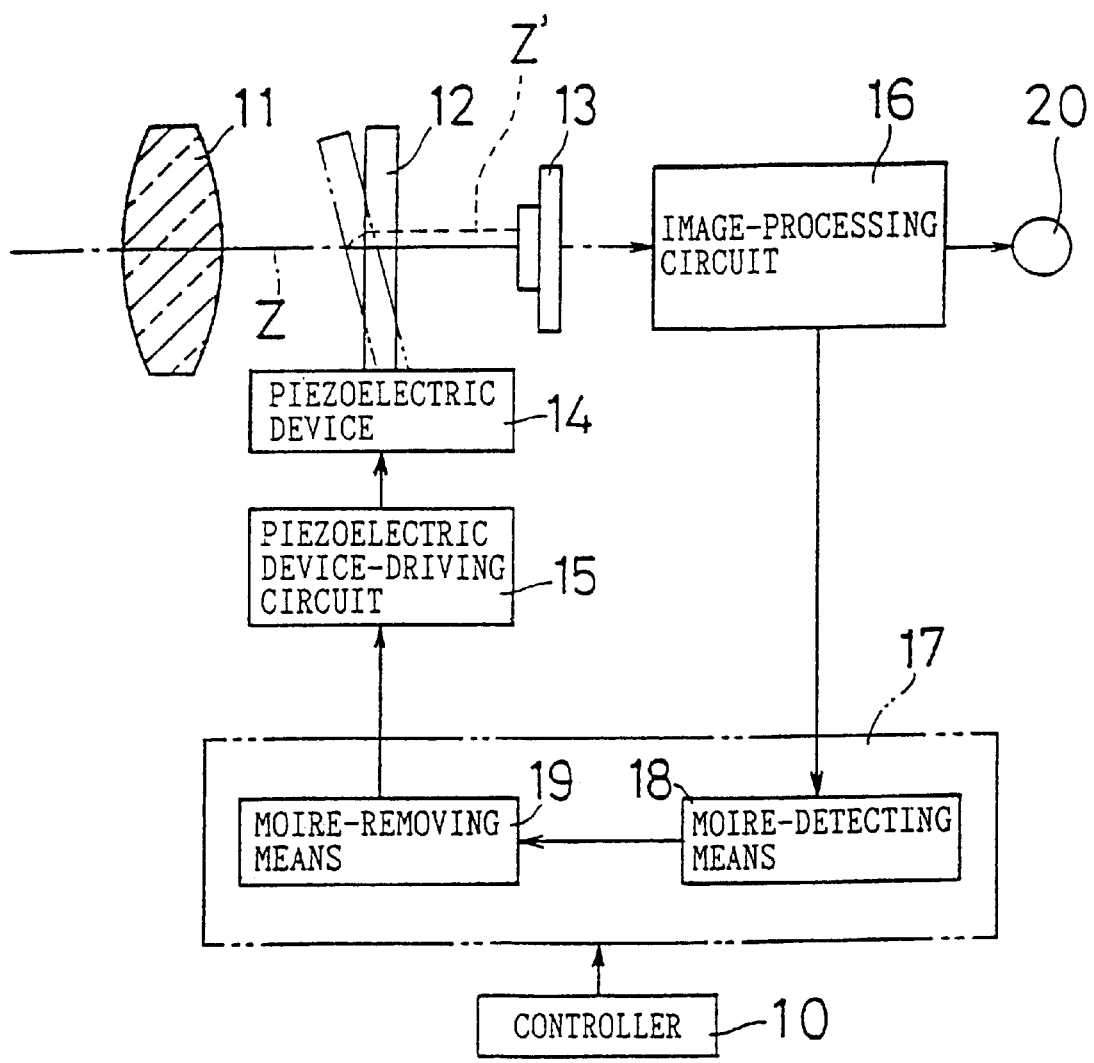
FIG. 1 is a schematic block diagram illustrative of the electric configuration of an image inputting apparatus according to an embodiment of the invention.

Now referring to the drawings, preferred embodiments of the invention are described below.

FIG. 1 illustrates the electric configuration of main portions of an image inputting apparatus according to an embodiment of the invention. A controller 10 controls switching between operation modes. Arranged along the optical axis Z are an optical system 11, a refracting plate 12 and a solid state imaging device 13; the refracting plate 12 may be displaced by a piezoelectric device 14 to tilt as indicated by the broken line. The optical system 11 comprises a lens for converging incident light from the subject, etc. The refracting plate 12 is constructed of a transparent material such as glass, and is flat. The solid state imaging device 13 is a CCD imaging device composed of 768×492 pixels, or about 380,000 pixels, arranged on its image pickup surface. The piezoelectric device 14 is electrically driven by a piezoelectric device-driving circuit 15 to displace the refracting plate 12 from the position perpendicular to the optical axis Z which is indicated by the solid line to the tilting position indicated by the broken line. Tilting of the refracting plate 12 results in displacement of the optical path to Z' as indicated by the dotted line. This displacement of the optical path incident upon the solid state imaging device 13 to Z' results in image shifting. Electric signals representing an image incident upon the solid state imaging device 13 are inputted to an image-processing circuit 16 to undergo A/D conversion, gamma correction, etc. and are then stored in an image memory (not shown) or the like. A control circuit 17 operates according to instructions from the controller 10.

The control circuit 17 operates differently depending on whether images with the normal resolution or images with higher resolution are inputted. FIG. 1 illustrates the configuration necessary to input images with the normal resolution. The control circuit 17 comprises moire-detecting means 18 and moire-removing means 19. In cases where image signals 20 outputted from the image-processing circuit 16 are stored in an image memory, images with the normal resolution may be stored as still images. However, when dynamic images which are successive images acquired with a video camera or the like, are inputted, the image signals 20 may be conventionally displayed on a display unit such as a CRT as video signals. It is also possible to input dynamic images acquired with a video camera as the ordinary operation, and to switch to a mode for inputting images with the higher resolution when it is desired to obtain still images.

The image inputting apparatus according to the embodiment is designed to perform an image shifting operation with the refracting plate 12 when images with the higher resolution are inputted. The control circuit 17 outputs a control signal to the piezoelectric device-driving circuit 15 so that the amount of displacement of the optical path Z' from the optical axis Z is set to be half the pixel pitch of the solid state imaging device 13. Synthesis of the two images displaced by half the pixel pitch of the solid state imaging device 13 results in an image with the higher resolution which is twice the normal resolution only in the direction of arrangement of the pixels. A method for synthesis of images by image shifting is explained in detail in, for example, pages 3–4 of Japanese Unexamined Patent Publication JP-A 63-284980. Here, although the image shifting is performed only in a monoaxial direction, the image shifting may be performed biaxially to increase both the horizontal and vertical resolution of the solid state imaging device 13.

Figure 2:
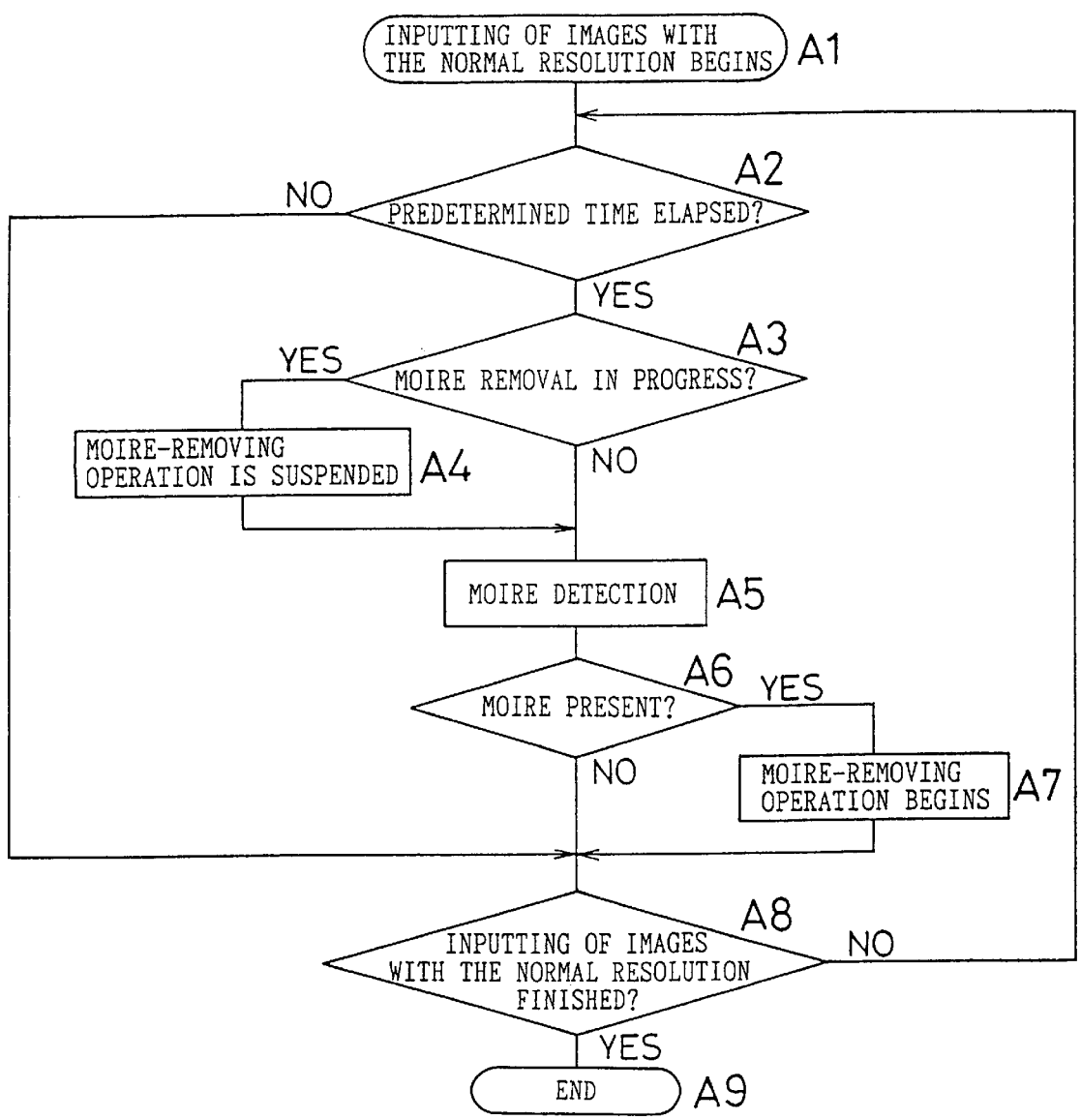
FIG. 2 is a flow chart illustrative of an example of the operation of the image inputting apparatus shown in FIG. 1.

FIG. 2 illustrates operations during and after input of an image with the normal resolution. In step A1, the control circuit 17 receives a control signal from the controller 10 which indicates an input mode at the normal resolution, and begins to input an image with the normal resolution. When an image with the normal resolution is inputted, first the piezoelectric device-driving circuit 15 is instructed to suspend the image-shifting operation to stop the piezoelectric device 14 at a predetermined position. While the piezoelectric device 14 is at the predetermined position, the refracting plate 12 remains untilted, with its surface almost perpendicular to the optical axis Z, and no image shifting is performed. The image taken by the solid state imaging device 13 undergoes processing such as A/D conversion and gamma correction in the image-processing apparatus 16, and is outputted as an image signal 20 to an image memory or the like provided in the next stage (not shown). In the next step A2, the time elapsed after the previous detection of a moire is measured, and the process proceeds to step A3 after lapse of a predetermined time.

In step A3, it is judged whether moire removal is in progress. When moire removal is in progress, the process proceeds to step A4 to suspend the moire-removing operation after lapse of a predetermined time of the moire-removing operation. When it is judged that the moire-removing operation is not in progress in step A3, or after step A4 has been finished, a moire-detecting operation by the moire-detecting means 18 begins in step A5. Details of the operation by the moire-detecting means 18 will be described later. Then, in step A6, it is judged whether a moire has been produced, on the basis of the result of moire detection by the moire-detecting means 18. When it is judged that a moire is present, the moire-removing means 17 starts the operation to remove the moire in step A7. In cases where it is judged in step A6 that a moire is not present, it is judged in step A2 that the predetermined time has not passed, or after the moire-removing operation has started in step A7, it is judged in step A8 whether a mode for inputting images with the normal resolution has been finished. When it is judged as not yet having been finished, the process returns to step A2 to repeat the operation for inputting images with the normal resolution. In cases where the input mode is judged in step A8 to have been finished, the operation for inputting images with the normal resolution ends in step A9.

It is judged in step A2 whether the moire-removing operation has continued over the predetermined time because once a moire is detected, there is no need to continue detecting moires except in cases where the image during taking changes suddenly. In other words, it is advisable to perform moire detection according to the embodiment at a predetermined interval. By the operations described above, moire removal is initiated or suspended depending on whether a moire has been produced, and thus no unnecessary moire-removing operation is performed; this results in lower power consumption.

According to the embodiment, however, since detection of moires is performed at a regular time interval, moire-detecting operations interrupt taking of images when dynamic images are being taken at the normal resolution, and the dynamic images pause. The pause is, however, only a moment, and thus presents no serious problem for normal operation.

Figure 3:
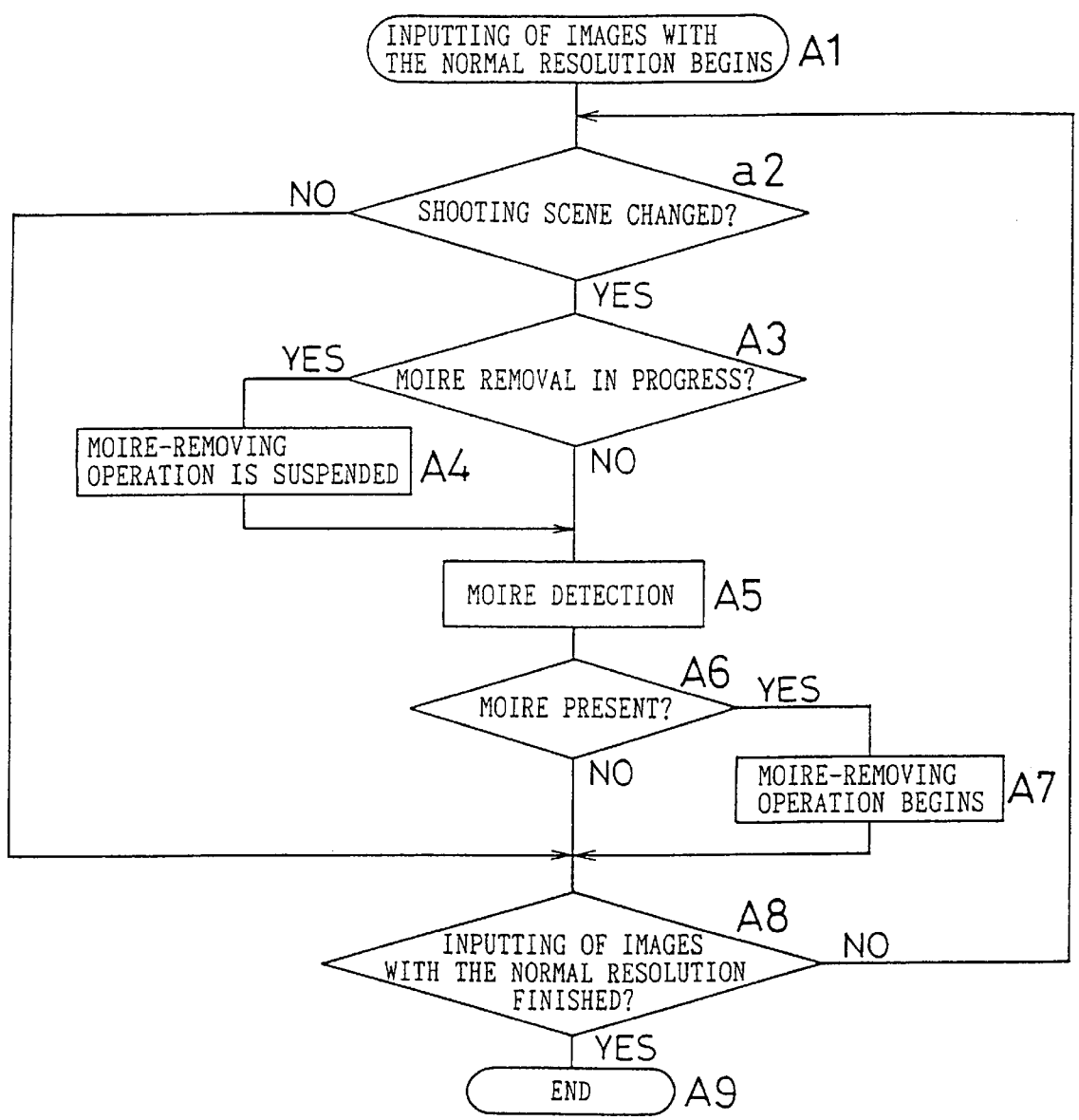
FIG. 3 is a flow chart illustrative of another example of the operation of the image inputting apparatus shown in FIG. 1.

FIG. 3 illustrates operations for further reducing the influence of the pause of dynamic images due to interruption by moire-detecting operations when the images are dynamic images. In FIG. 3, the steps of operations which are identical to those shown in FIG. 2 are indicated by like reference characters, and further explanation thereof will be omitted. The operation to input an image with the normal resolution begins in step A1, and it is judged in step a2 whether switching is made between scenes of the dynamic image when they are taken. Switching between shooting scenes will be later described in detail. When it is judged in step a2 that switching between shooting scenes has been completed, the process proceeds to step A3. When it is judged that the switching between shooting scenes has not yet been completed, the process proceeds to step A8. In other words, when it is judged that the switching between shooting scenes is in progress or is not made, neither moire detection nor moire removal is performed. Since the switching between shooting scenes results in switching between images, pause of the dynamic image due to moire-detecting and moire-removing process which is performed at the moment of switching causes no sense of disharmony. Specifically, the switching between shooting scenes is caused by initial input of an image upon operation of the image pickup button of the video camera or the image-recording button of the image-recording unit, completion of the activated zoom capabilities of the video camera, termination of the panning operation of the imaging device to change the direction of shooting, sudden changes in the image, changes in shooting conditions such as aperture, shutter speed and the storage mode of the CCD, etc., all of which may be detected or characteristically judged with the aid of software. It is also possible to combine the switching between shooting scenes and moire detection at a regular time interval as illustrated in FIG. 2 so as not to initiate moire-removing operations for a predetermined time after switching between shooting scenes.

Figure 4:
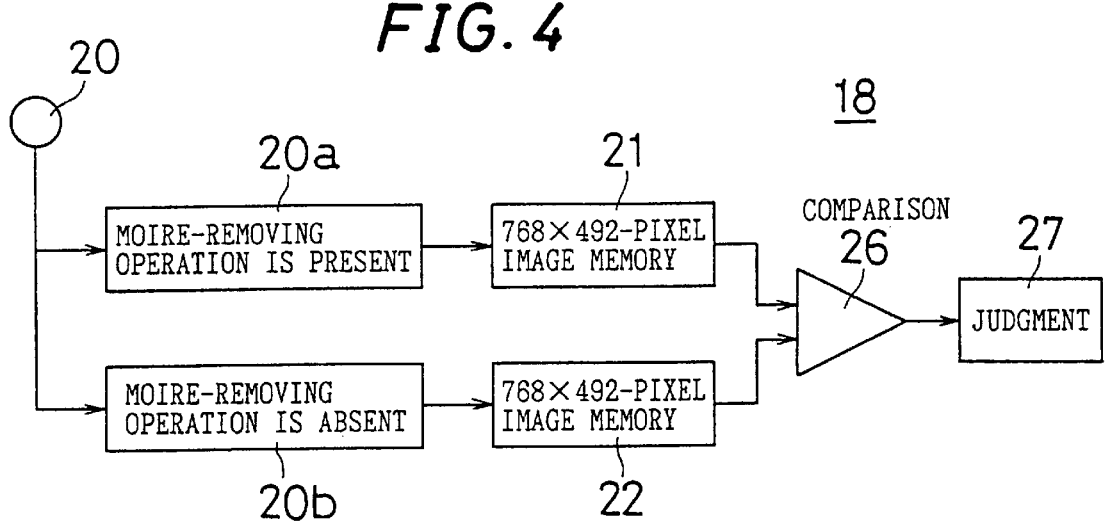
FIG. 4 is a block diagram illustrative of an example of the electric configuration of the moire-detecting means 18 shown in FIG. 1.

FIG. 4 illustrates a configuration for moire detection in step A5 in FIG. 2 and FIG. 3. When moire detection starts, one frame of image signals 20 are inputted to the solid state imaging device 13 by activating the moire-removing means 19 (20a), and stored in an image memory 21 capable of storing image signals of 768×492 pixels in the image pickup surface of the solid state imaging device 13. The next frame of image signals 20 are then inputted to the solid state imaging device 13 without activating the moire-removing means 19 (20b), and stored in another image memory 21 capable of storing image signals of 768×492 pixels of the solid state imaging device 13. The stored contents of the image memories 21, 22 are compared with each other by comparing means 26 on a pixel-by-pixel basis, and the differences are calculated. Judging means 27 judges whether a moire has been produced, depending on whether the sum of the differences for one frame is over a predetermined value, and outputs a signal indicating the result of the judgment. This is because the difference made between involving the moire-removing operation (20a) and not involving the moire-removing operation (20b) may be judged to be an indicator of production of a moire.

Figure 5:
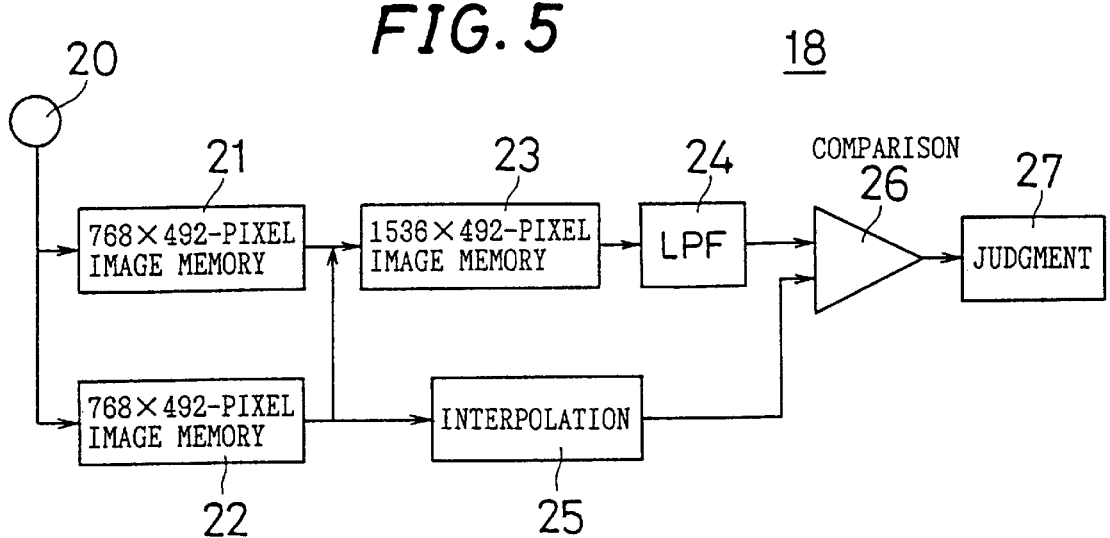
FIG. 5 is a block diagram illustrative of another example of the electric configuration of the moire-detecting means 18 shown in FIG. 1.

FIG. 5 illustrates another example of moire detection. One frame of image signals 20 are stored in the image memory 21 capable of storing image signals of 768×482 pixels. The piezoelectric device-driving circuit 15 is then activated to supply the piezoelectric device 14 with a predetermined signal to tilt the refracting plate 12 so that the optical axis is shifted in the direction horizontal to arrangement of pixels in the solid state imaging device 13 to perform image shifting. The amount of this image shifting is set to half the horizontal pixel pitch of the solid state imaging device 13. Image signals 20 for a second frame are inputted in this state, and stored in another memory 22 as image signals of 768×492 pixels. The stored contents of the image memories 21, 22 are synthesized as pixels each horizontally displaced by half the size of a pixel in an image memory 23 capable of storing contents of 1536×492 pixels. This synthesis of the images is accomplished by the same manner as for acquiring images with the second resolution, which is higher than the first resolution, by image shifting.

The stored contents of the image memory 23 are then read out to cut off the high spatial frequency components through a low-pass filter (hereunder abbreviated to "LPF"). The stored contents of the image memory 22 are interpolated by interpolating means 25 so as to have the same number of pixels as the stored contents of the image memory 23, and are compared with output from the LPF 24 by comparing means 26 on a pixel-by-pixel basis. Differences calculated on a pixel-by-pixel basis are summed for one frame, and judging means 27 judges whether a moire has been produced, depending on whether the calculated sum of the differences is over a predetermined value. The interpolation by the interpolating means 25 may be, for example, common linear interpolation for interpolation of horizontally arranged pixels in such a manner that image outputs of the intermediate pixels are set to be the average of image outputs of the pixels at both ends, or zero-order interpolation which matches all the image outputs to one image output. Here, although horizontally image-shifted image signals with the higher resolution are stored in the image memory 23, the image shifting may be vertical or both horizontal and vertical to produce images with higher resolutions. The arrangement of pixels which are stored in the image memory 23 is matched to the respective image-shifting modes.

The principle which allows the configuration illustrated in FIG. 5 to detect moires is that images at spatial frequencies identical to the spatial sampling frequencies of the pixels of the solid state imaging device 13 usually have the most obtrusive moires. Although the image produced by image shifting by half the pixel pitch of the solid state imaging device 13 may also have a moire, the moire image of the image produced by image shifting is opposite in phase to the moire image of the images not subjected to image shifting, and thus the moire images cancel each other out in the image synthesized from the paired images. Accordingly, the difference between the storage contents of the image memory 23, that is, the synthetic image or an image with the higher resolution, and those of the image memories 21, 22, that is, the images prior to synthesis, represents the extent of the moire. Here, since the synthetic image contains high spatial frequency image components unlike the images prior to the synthesis, and a moire may be produced at high spatial frequencies, it is necessary to perform processing to cut the high spatial frequency components through the LPF 24 prior to the comparison by the comparing means 26. It is also possible to subject signals read out from the storage contents of the image memories 21, 22 and 23 to FFT digital signal processing and to compare power at the spatial frequencies at which moires are most obtrusive.

Figure 6:
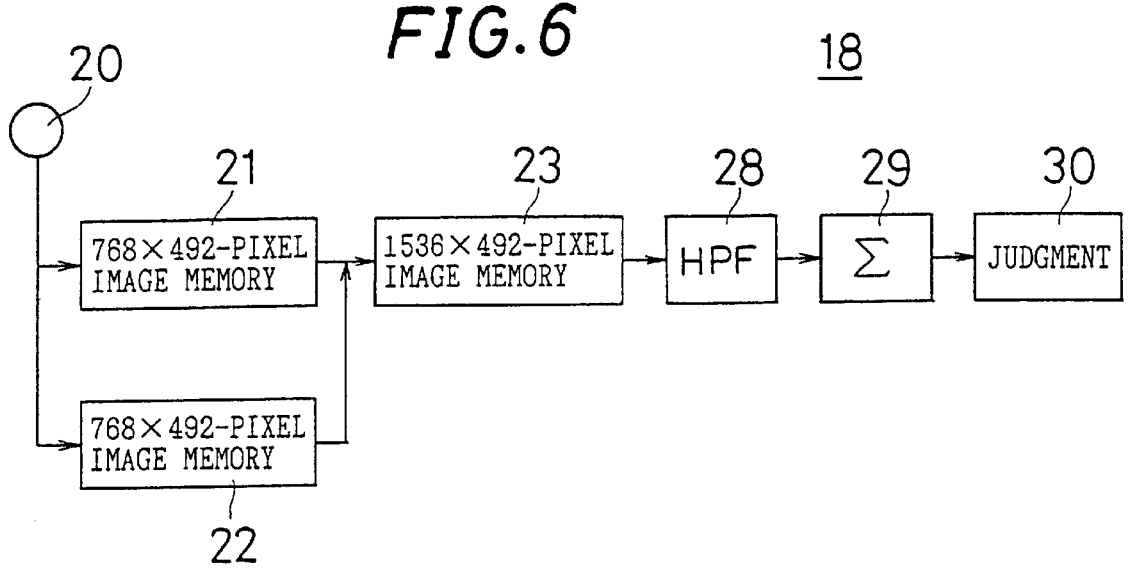
FIG. 6 is a block diagram illustrative of yet another example of the electric configuration of the moire-detecting means 18 shown in FIG. 1.

FIG. 6 illustrates yet another configuration for moire detection. For moire detection, one frame of image signals 20 are first inputted and stored in a 768×492-pixel image memory 21. A piezoelectric device-driving circuit 15 is then activated to drive a piezoelectric device 14 at a predetermined output to thereby tilt a refracting plate 12 so that image shifting is performed in the direction horizontal to arrangement of pixels of a solid state imaging device 13. The amount of this image shifting is set to be half the horizontal pixel pitch of the solid state imaging device 13. In this state, image signals 20 for the second frame are inputted to another image memory 22. This image memory 22 is also capable of storing image signals of 768×492 pixels. The stored contents of the respective pixels of the image memories 21, 22 are then synthesized following the arrangement of the pixels, and are stored in an image memory 23 capable of storing image signals of 1536×492 pixels. These procedures are identical to those used for acquiring images with the higher resolution by image shifting. The stored contents of the image memory 23 are then read out to cut off low spatial frequency components through a high-pass filter (hereunder abbreviated to "HPF") 28. Values of intensity of the respective pixels are then summed by operating means 29, and judging means 30 judges whether a moire has been produced, depending on whether the operated sum is over a predetermined value, to output a signal indicating the result of the judgment.

With the configuration illustrated in FIG. 6 as well, the image shifting may be made not only in a horizontal direction, but also vertically or both horizontally and vertically to produce images with higher resolutions. When the shifting direction is changed, arrangement of pixels in the image memory 23 is changed accordingly to match the changed direction of image shifting. The foregoing procedures are based on the principle that since a moire is produced due to presence of high spatial frequency components in the inputted image which have a period less than twice the pixel pitch of the solid state imaging device 13, detection of the high spatial frequency components of the image with the higher resolution, that is, the components having a period less than twice the pixel pitch, serves as an estimate of the extent of the moire of the image with the normal resolution. Instead of the processing by the HPF 28 and the operating means 29, it is also possible to judge whether a moire has been produced, by reading out the stored contents of the image memory 23 which are then subjected to processing by FFT digital signal processing, and comparing the magnitude of the power at the higher spatial frequencies.

Figure 7:
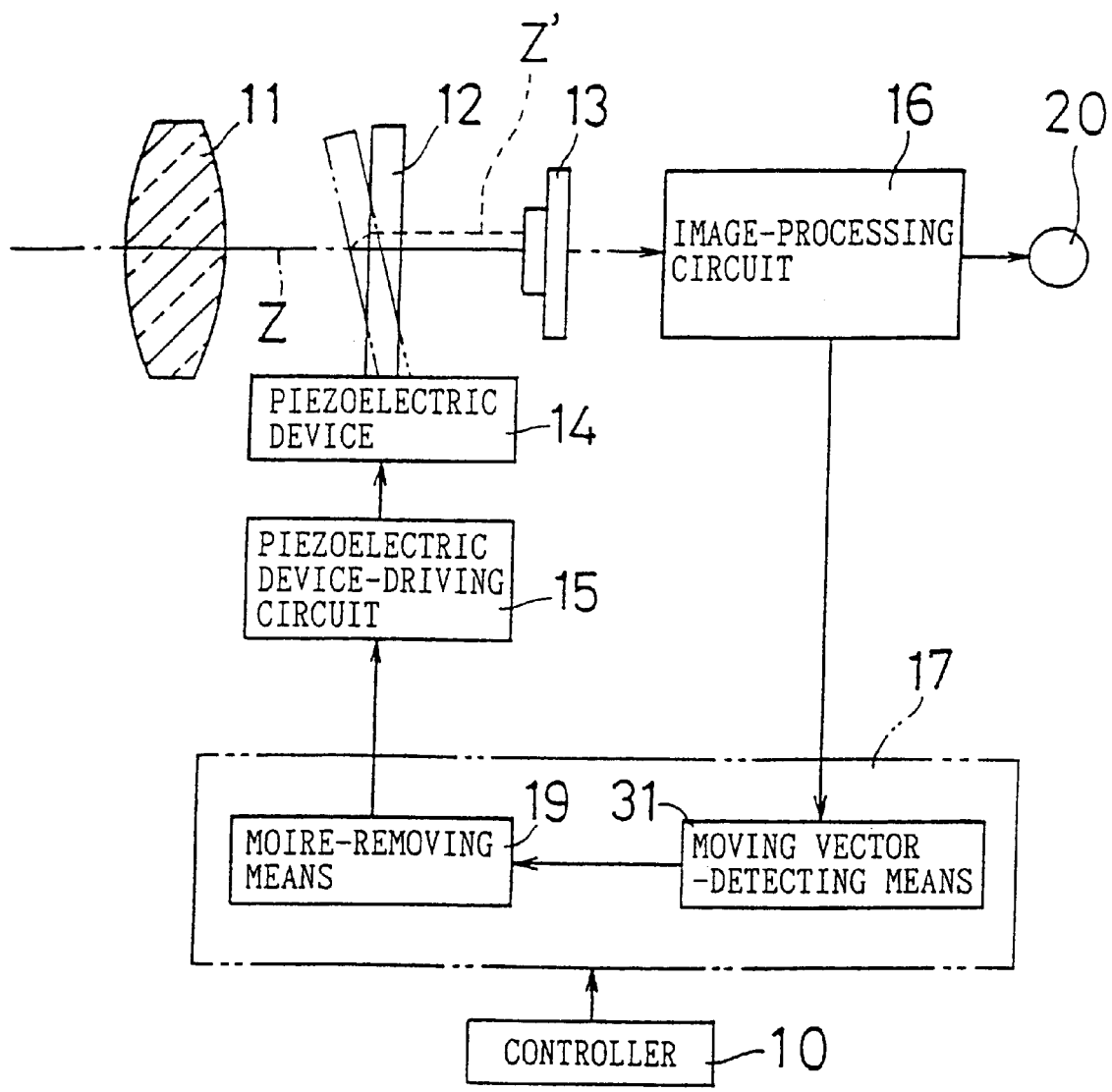
FIG. 7 is a schematic block diagram illustrative of the electric configuration of an image inputting apparatus according to another embodiment of the invention.

FIG. 7 illustrates an electric configuration of main portions of another embodiment of the image inputting apparatus according to the invention. In FIG. 7, the members which are identical to those shown in FIG. 1 are indicated by like reference characters, and explanation thereof will be omitted to avoid repetition. According to the embodiment, moving vector-detecting means 31 is provided in a control circuit 17, and operation of moire-removing means 19 is controlled based on the result of detecting the moving vector when an image of the normal resolution is inputted. The operation for inputting images with the higher resolution is the same as that illustrated in FIG. 1.

Figure 8:
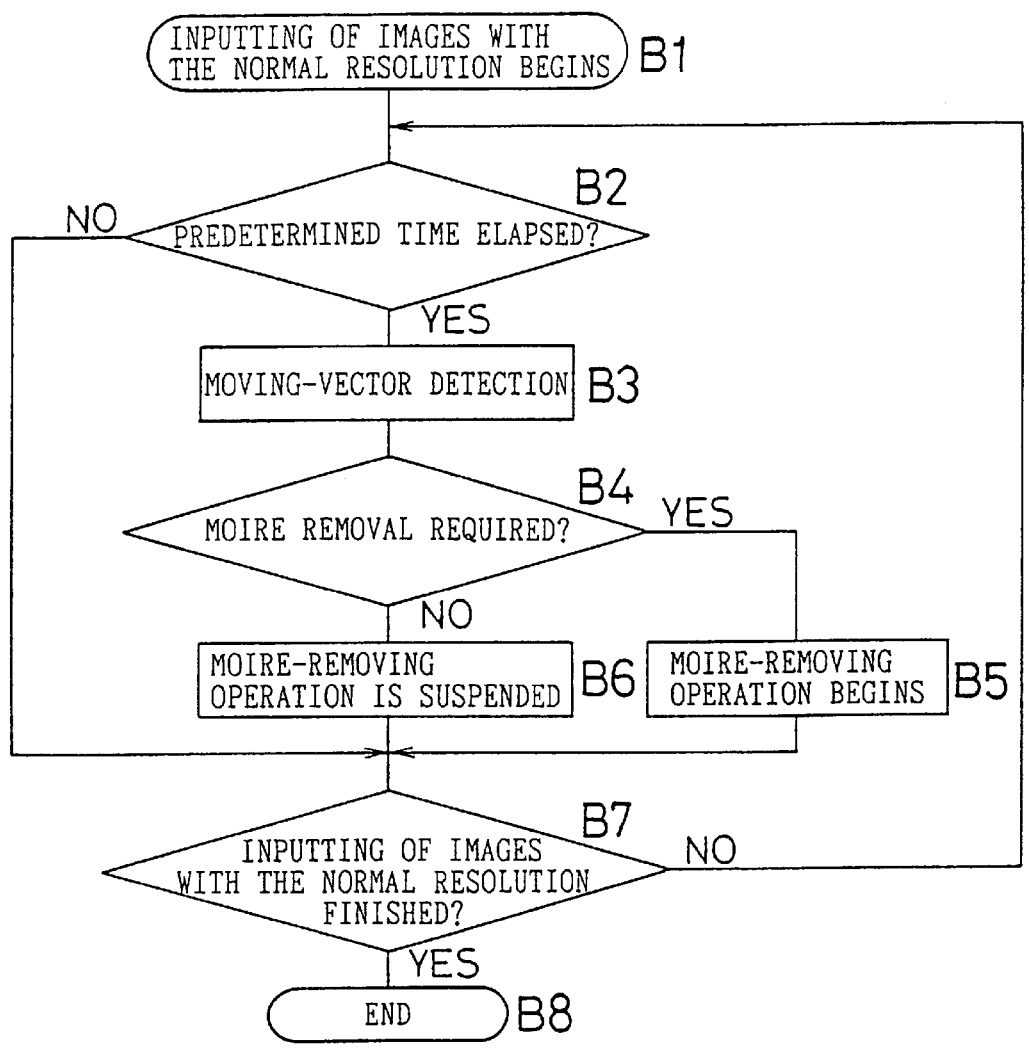
FIG. 8 is a flow chart illustrative of the operation of the image inputting apparatus shown in FIG. 7.

FIG. 8 illustrates the operation during and after input of an image with the normal resolution using the embodiment illustrated in FIG. 7. In step B1, upon receipt of a control signal from the controller 10 which indicates the mode for inputting an image with the normal resolution, preparations are made for inputting an image with the normal resolution, and when image shifting is in progress, the piezoelectric device-driving circuit 15 is instructed to suspend the image-shifting operation, upon which the piezoelectric device 14 is stopped at a predetermined position. Since this does not cause tilting of the refracting plate 12, its state remains unchanged, with its surface almost perpendicular to the optical axis Z, and thus no image shifting occurs. When inputting of an image with the normal resolution begins, the image taken by the solid state imaging device 13 undergoes processing such as A/D conversion and gamma correction through the image-processing circuit 16, and is then outputted as an image signal 20 to an image memory or the like in the next stage (not shown). In step B2, it is judged whether the time elapsed after the previous detection of a moire is over a predetermined time, and the process proceeds to step B3 when the judgment is "yes". In step B3, the moving vector-detecting means 31 detects a moving vector indicative of moves from the image information. Details of the operation of the moving vector-detecting means 31 will be described later. In the next step B4, it is judged whether it is necessary to perform moire removal on the basis of the magnitude of the moving vector which is derived from the result of detection by the moving vector-detecting means 31; when it is judged that removal is required, the operation of the moire-removing means 19 is initiated in step B5 to remove the moire. In cases where it is judged in step B4 that no moire removal is necessary, the moire-removing operation is suspended in step B6. In all the cases where the moire-removing operation is initiated in step B5, it is judged in step B2 that the predetermined time has not yet lapsed, and the moire-removing operation is suspended in step B6, it is judged in step B7 whether the mode for inputting images with the normal resolution has been finished; when judged as not yet finished, the process returns to step B2 to repeat the operation for capturing an image with the normal resolution. When judged as finished in step B7, the operation for inputting images with the normal resolution is finished in step B8.

Figure 9:
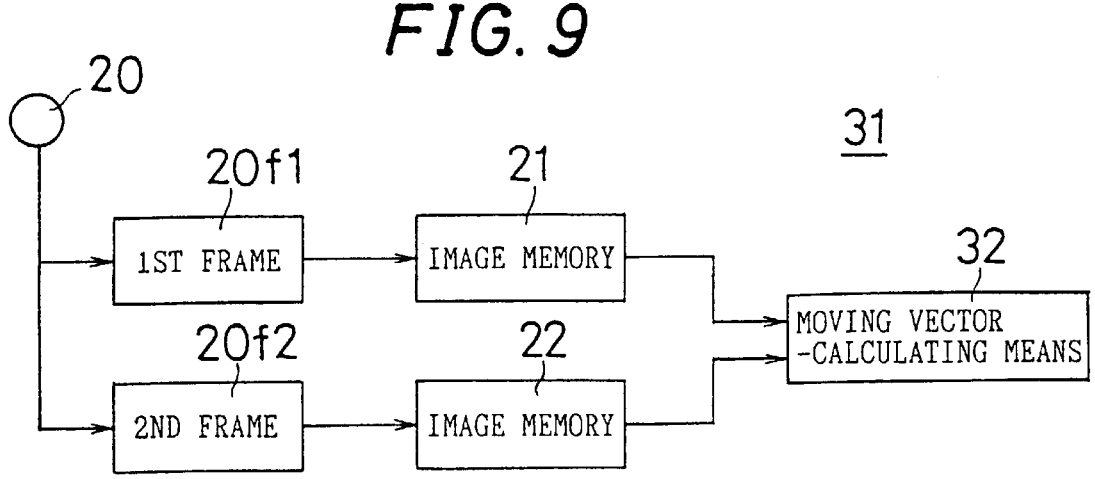
FIG. 9 is a block diagram illustrative of the electric configuration of the moving vector-detecting means 31 shown in FIG. 7.

FIG. 9 illustrates a configuration for the moving vector-detecting operation in step B3 shown in FIG. 8. As indicated in step B2 in FIG. 8, image signals 20 are captured to detect a moving vector at a predetermined time interval. Image signals for the first frame 20f1 are stored in an image memory 21. Image signals for the second frame 20f2 are stored in an image memory 22 which is different from the image memory 21. Image data stored in the image memories 21, 22 are calculated by moving vector-calculating means 32 as the moving vector between the image signals at intervals of the frame times. The method of calculating the moving vector may be any well-known method such as the gradient method, the representative point-matching method, the optical flow method, etc. It is then judged whether to activate the moire-removing means 19, depending on the magnitude of the absolute value of the calculated moving vector.

According to experiments conducted by the inventors of the present application, a moire is produced or is felt obtrusive only when the image is static or moves slowly, and the influence of the moire, if it has been produced, seems to be negligible when the image moves greatly. Accordingly, the design is such that moire removal is performed at least to an unobtrusive level in cases where the calculated quantity of the moving vector is smaller than the predetermined amount, whereas moire removal is not performed when the moving vector is larger than the predetermined amount. Here, concrete values of the predetermined amount used as the criteria for the judgment differ depending on the number of pixels of the solid state imaging device 13, the method of using the image inputting apparatus, etc., and thus it is advisable to determine the amount on the basis of measurements obtained with respective types of apparatuses. Here, although the moire-removing operation is designed to be performed at a predetermined time interval in step B2, this step is not a requisite step. This is because the moving vector detection is performed using data stored in the image memories 21, 22, and thus, unlike the embodiment illustrated in FIG. 1 for inputting of images with the normal resolution, the image-inputting operation is not required to be suspended, and therefore the moire detection may be performed at any time.

Figure 10:
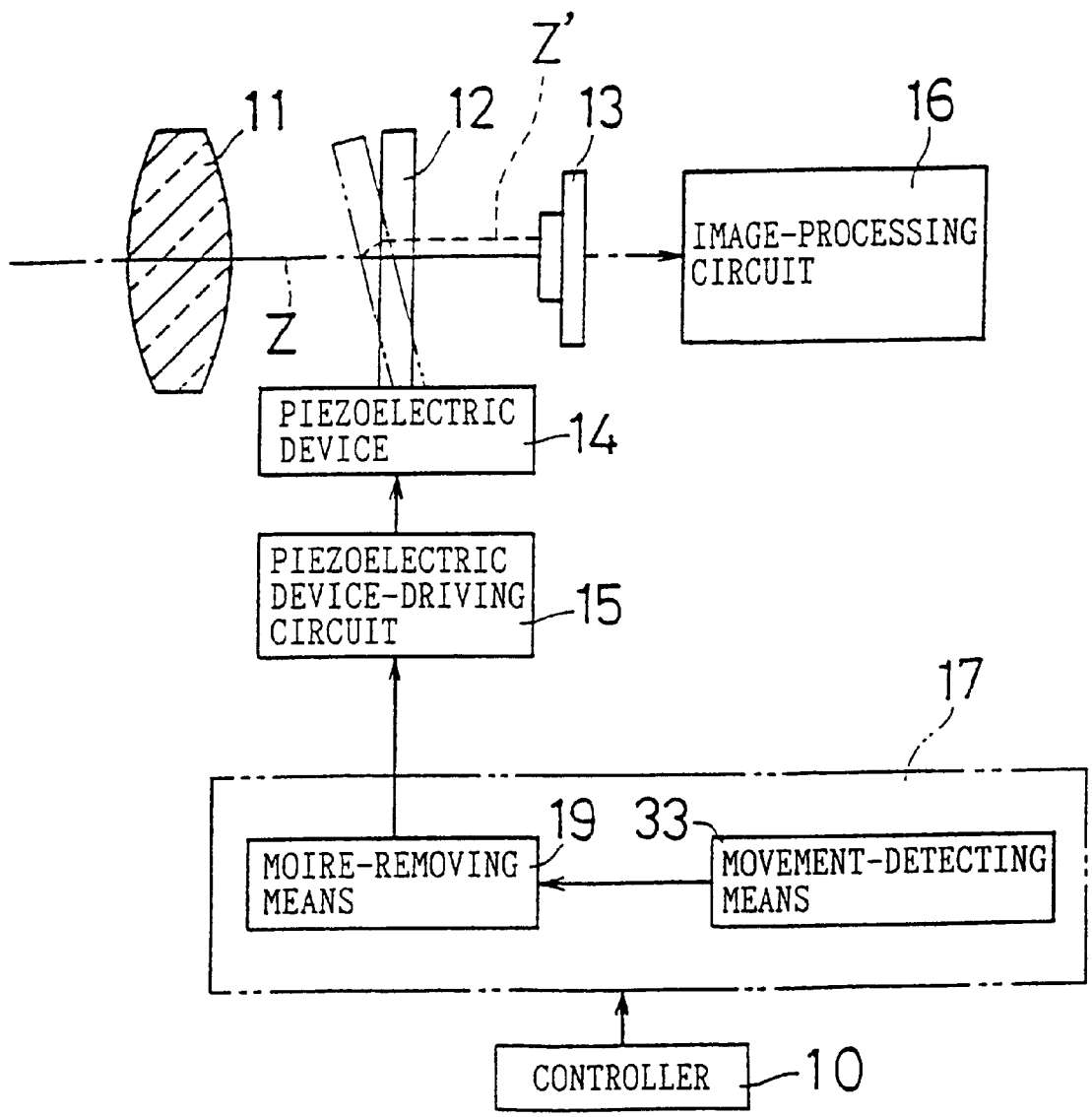
FIG. 10 is a schematic block diagram illustrative of the electric configuration of an image inputting apparatus according to yet another embodiment of the invention.

FIG. 10 is a schematic illustrative of an electric configuration of main portions of an image inputting apparatus according to yet another embodiment of the invention. In FIG. 10, the members which are identical to those shown in FIG. 1 or FIG. 7 are indicated by like reference characters, and explanations thereof will be omitted to avoid repetition. According to the embodiment, movement-detecting means 33 is contained in a control circuit 17, and the operation for inputting images with the higher resolution is the same as according to the embodiments illustrated in FIG. 1 and FIG. 7.

Figure 11:
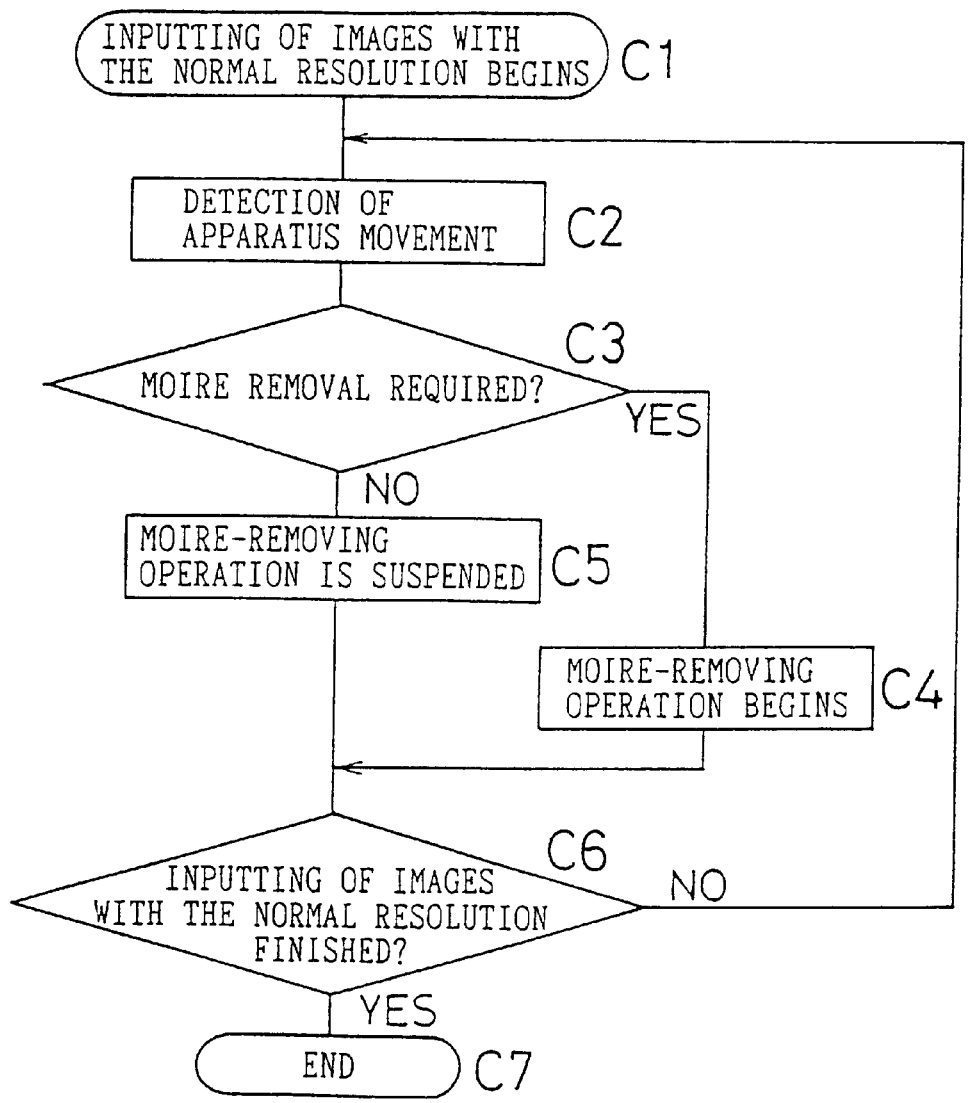
FIG. 11 is a flow chart illustrative of the operation of the image inputting apparatus shown in FIG. 10.

FIG. 11 illustrates the operations according to the embodiment shown in FIG. 10. In step C1, upon receipt of a control signal from the controller 10 which indicates the mode for inputting images with the normal resolution, the control circuit 17 instructs the piezoelectric device-driving circuit 15 to suspend the image-shifting operation and thereby stop the piezoelectric device 14 at a predetermined position when image shifting is in progress. This causes the surface of the refracting plate 12 to be held almost perpendicular to the optical axis Z, and thus no image shifting occurs. The image taken by the solid state imaging device 13 undergoes processing through the image-processing circuit 16 and is then outputted as an image signal 20 to an image memory or the like in the next stage. In the next step C2, the movement-detecting means 33 detects the movement of the image inputting apparatus. Details of the movement-detecting means 33 will be described later. In the next step C3, it is judged whether it is necessary to perform moire removal on the basis of the magnitude of movement of the image inputting apparatus which is derived from the result of detection by the movement-detecting means 33. When it is judged that moire removal is required, the moire-removing means 19 initiates a moire-removing operation in step C4. In cases where it is judged in step C3 that moire removal is not necessary, the moire-removing operation is suspended in step C5. In cases where the moire-removing operation is finished in step C4, or the moire-removing operation is suspended in step C5, it is judged in step C6 whether the mode for inputting images with the normal resolution is to be finished. When judged as not finished, the process returns to step C2 to repeat the operation until the mode for inputting images with the normal resolution is finished. When it is judged in step C6 that the inputting has been finished, the operation ends in step C7.

Figure 12:
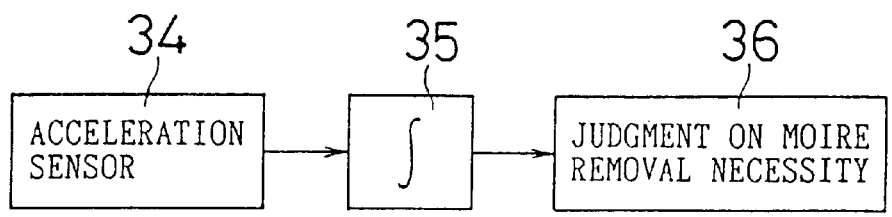
FIG. 12 is a block diagram illustrative of the electric configuration of the movement-detecting means 33 shown in FIG. 10.

FIG. 12 illustrates a configuration of the movement-detecting means shown in FIG. 10. Output from an acceleration sensor 34 which may be installed at any desired position in the image inputting apparatus are integrated through an integrating circuit 35. Since the accelerations are integrated, the outputs from the integrating circuit 35 are worked out as the movement speed of the image inputting apparatus. Judging means 36 judges whether moire removal is required, depending on the magnitude of the absolute value of the movement speed outputted from the integrating circuit 35.

According to experiments conducted by the inventors of the present application, a moire is felt obtrusive only when the image is static or moves slowly, and the influence of the moire in the image signal, if it has been produced, seems to be negligible when the image inputting apparatus moves, even if the subject is static. Accordingly, the design is such that moire removal is performed in cases where the detected movement speed of the image inputting apparatus is smaller than the predetermined amount, whereas moire removal is not performed when the speed is larger than the predetermined amount. Here, concrete values of the predetermined quantity used as the criteria for the judgment may be determined experimentally. Further, although the detection of the movement of the image inputting apparatus is performed by the acceleration sensor 34, the movement of the image inputting apparatus may be detected in the same manner even when another sensor, for example, a commercially available gyrosensor or position sensor, is used. According to the present embodiment, since the judgment on necessity of moire removal is not made based on the image information, the judgment regarding the moire-removing operation may be made with no influence exerted upon the image information.

According to the respective embodiments described above, moire removal is accomplished through enlargement of the apparent opening of each pixel of the solid state imaging device 13. According to the embodiment illustrated in FIG. 1, for initiation of moire removal, the control circuit 17 instructs the piezoelectric device-driving circuit 15 to perform a rapid, minute image-shifting operation to thereby activate the piezoelectric device 14 at the timing described later. During the storage time of the solid state imaging device 13, a plurality of the images resulting from the image shifting are inputted to cause enlargement of the apparent opening for moire removal.

Figure 13A:
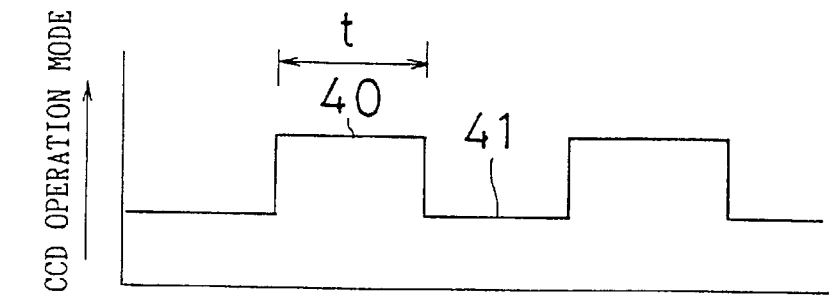
FIGS. 13A and 13B are time charts illustrative of an example of the operation of the moire-removing means 19 shown in FIG. 1, FIG. 7 and FIG. 10.
Figure 13B:
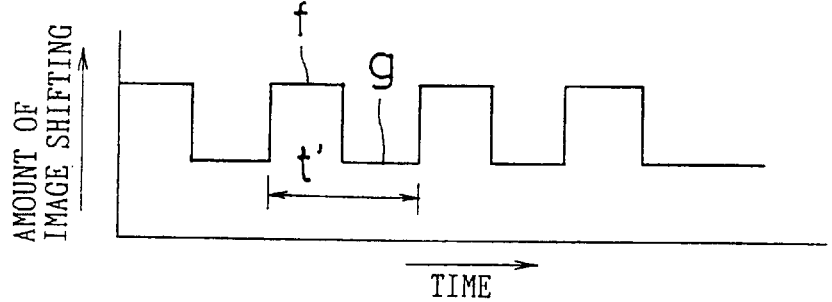

FIG. 13 illustrates timing for the moire-removing operation. FIG. 13(a) illustrates timing for the operation of the solid state imaging device 13, and FIG. 13(b) illustrates timing for the image shifting operation for moire removal, with the amount of shifting of the optical axis due to image shifting plotted along the axis of ordinates. The storage time t of the solid state imaging device 13 is indicated by the reference character 40, and the transfer period of the stored information is indicated by the reference character 41. The solid state imaging device 13 basically performs the operations indicated by 40, 41 through a driving circuit (not shown), and the storage time t corresponds to the period of ordinary cameras in a shutter open position. The period t' of the image-shifting operation for moire removal has a value for the storage time t which is calculated by the following equation (1):

$$t' = t/2^n \quad (1)$$

In the equation, "n" is an integer of one or more. With the period t' of the image-shifting operation which is set according to the equation above, the incident intensities of images f, g shifted with respect to the optical axis which are inputted via the image-shifting operation during the storage time t of the solid state imaging device 13 are made even. This is equal to enlargement of the apparent opening of each pixel of the solid state imaging device 13, and thus the moire removal is effectively accomplished eventually. This is because the enlargement of the apparent opening of each pixel of the solid state imaging device 13 results in a reduction in the so-called MTF (Modulation Transfer Function) characteristics of the solid state imaging device 13 for high spatial frequency components and thus in cutoff of the high spatial frequency components of the image which may produce moires.

Figure 14A:
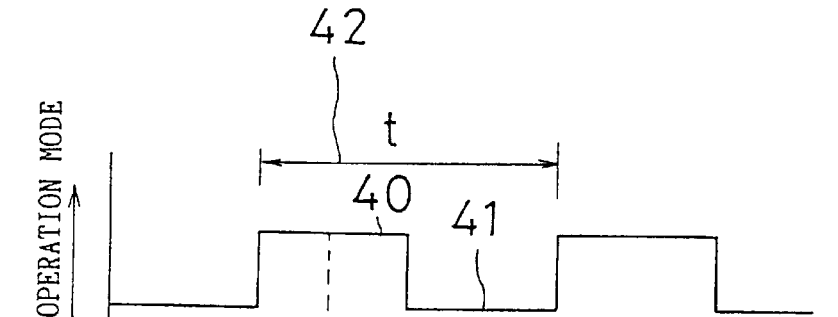
FIGS. 14A and 14B are time charts illustrative of another example of the operation of the moire-removing means 19 shown in FIG. 1, FIG. 7 and FIG. 10.
Figure 14B:
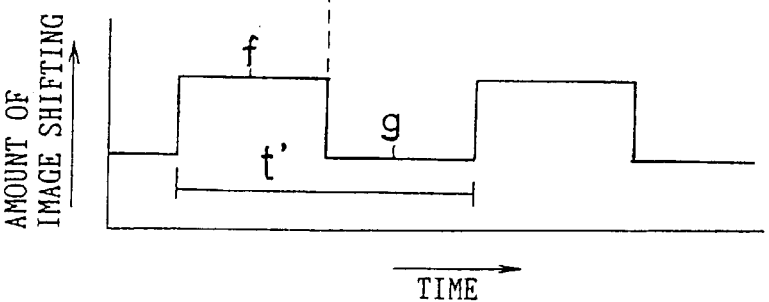

FIG. 14 illustrates another principle for the moire removing operation. Although the storage time t of the solid state imaging device 13 and the period t' of the image-shifting operation are shown to be equal in FIG. 13, they are actually different in most cases. In cases where the duty ratio is not 50%, the image-shifting operation described above is discontinuous. Generally speaking, the operation is preferably continuous, and the driving power consumption during the operation can be minimized. In FIG. 14 as well, the moire removal is accomplished through enlargement of the apparent opening of each pixel of the solid state imaging device 13. FIG. 14(a) illustrates timing for the operation of the solid state imaging device 13, and FIG. 14(b) illustrates timing for the image-shifting operation for moire removal. When the period of the storage time of the solid state imaging device 13 is indicated by the reference character 40, and the transfer period for the stored information is indicated by the reference character 41, the period t of the storage time of the solid state imaging device 13 is indicated by the reference character 42. The midpoint of the storage time of the solid state imaging device 13 is indicated by the reference character 43. The solid state imaging device 13 performs the operation indicated in (a) with a driving circuit (not shown). On the other hand, the period t' of the image-shifting operation for moire removal is set to have a value for the storage time t which is calculated according to the following equation (2):

$$t' = 2t/2^n \quad (2)$$

In the equation, "n" is an integer of one or more. The image-shifting operation is driven in reverse once at each midpoint 43 of the storage time of the solid state imaging device 13. When the period t' of the image-shifting operation is set according to the equation above, the incident intensities of images f, g which are inputted via the image-shifting operation during the storage time t of the solid state imaging device 13 are made even, the image-shifting operation may be performed continuously at a duty ratio of 50%, and thus the power consumption due to the moire-removing operation can be reduced. Here, although the image shifting operation is designed to trail a rectangular wave in FIG. 13 and FIG. 14, the same effect may be produced even when driven to trail a sine wave.

Figure 15:
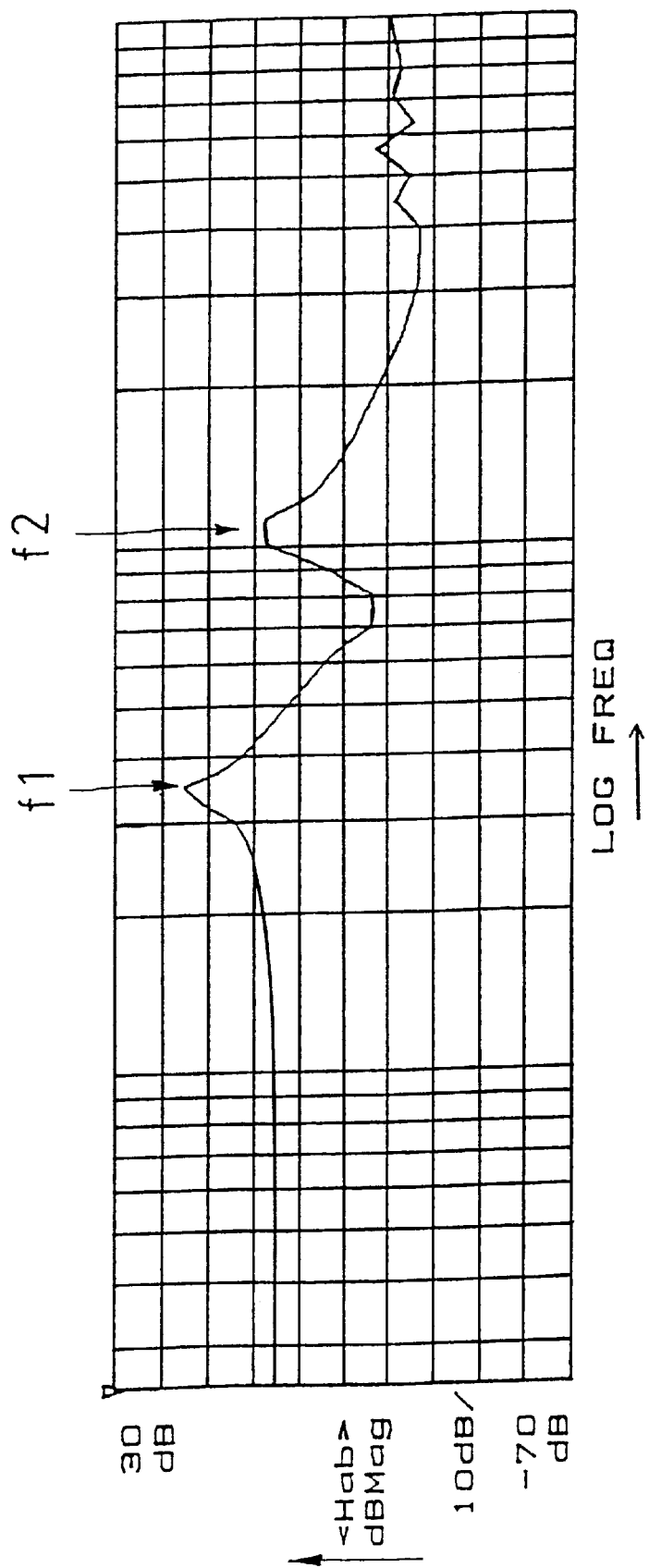
FIG. 15 is a graph showing the mechanical resonance characteristics of the refracting plate 12 and the piezoelectric device 14 shown in FIG. 1, FIG. 7 and FIG. 10.

FIG. 15 a graph showing results of measurement of frequency characteristics of the movable section of the image-shifting means which contains the refracting plate 12, which is presented to facilitate understanding of the concept of moire removal according to yet another embodiment of the present invention. The axis of abscissas represents frequency on a log scale, and the axis of ordinates represents amplitude in units of dB. f1 and f2 represent first and second resonance frequencies, respectively. Particularly, the first resonance frequency f1 has a vibration mode in the direction of tilt of the refracting plate 12, and the power consumption is minimal when the refracting plate 12 is driven at this first resonance frequency. Accordingly, setting the drive frequency for the moire removal by image shifting to match the first resonance frequency f1 results in minimized power consumption due to the moire removal. In addition, when the first resonance frequency f1 is set so as to match its reciprocal to the period t' according to the embodiment shown in FIG. 13 or FIG. 14, the effects described above may be produced simultaneously.

Figure 16:
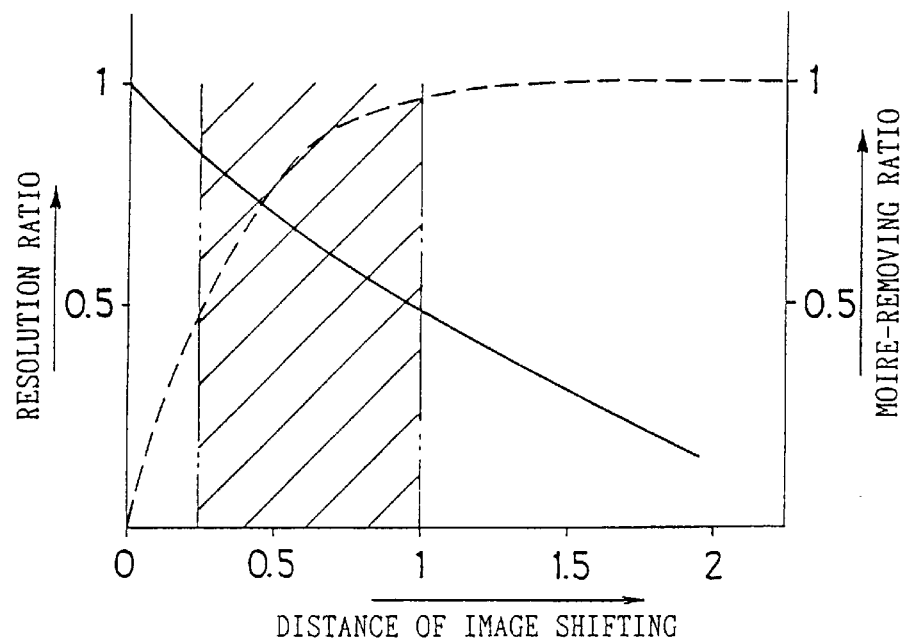
FIG. 16 is a graph showing the relationship between the distance of image shifting by the refracting plate 12 and the piezoelectric device 14, and the resolution ratio and the moire-removing ratio.
Figure 17:
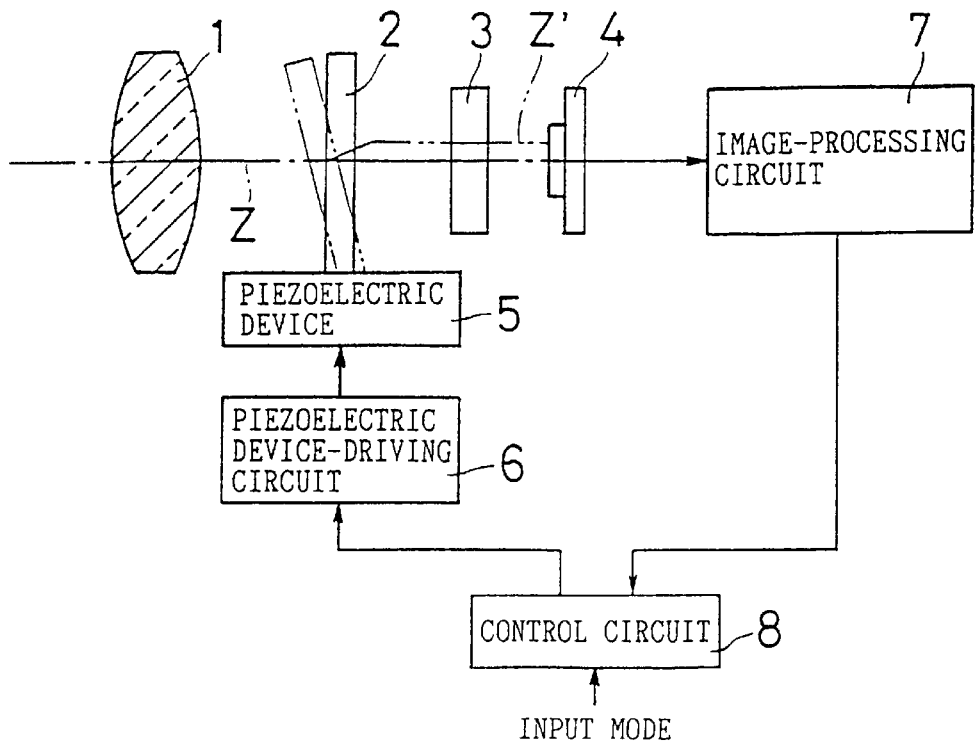
FIG. 17 is a schematic block diagram illustrative of the electric configuration of an image inputting apparatus of the prior art.

FIG. 16 is a graph showing the relationship between the distance of image shifting, the resulting resolution and the moire removal effect. The axis of abscissas represents the amount of image shifting by the image-shifting means for moire removal in units of the pixel pitch of the solid state imaging device 13. The axis of ordinates represents the resolution ratio and the moire removal ratio. The resolution ratio indicated by the solid line is the ratio of the resolution at the center of each of the resolution charts taken at various distances of image shifting to the resolution at the center of the solid state imaging device 13 when the distance of image shifting, that is, the amount of displacement of the optical axis, is zero, i.e. when no image-shifting operation is performed, at which the ratio is defined to be one. The moire removal ratio indicated by the dotted line represents ratios of moire removal for different amounts of image shifting which are judged subjectively with reference to circular-zone plate charts taken, defining as zero with the degree of moire removal of the image when the amount of image shifting by the image-shifting means for moire removal, and defining as one the degree of moire removal when the amount of image shifting is two.

The result shown in FIG. 16 shows that the distance of image shifting which removes moires most effectively and does not substantially influence the resolution ranges from 0.25 to 1.0. Accordingly, it is concluded that the distance of image shifting as the moire-removing means 19 according to the respective embodiments is preferably 0.25–1.0 times the pixel pitch of the solid state imaging device 13. Although the foregoing description focuses on directions horizontal to the image pickup surface of the solid state imaging device 13, the same concept may of course be applied to directions perpendicular thereto, and even to a combination thereof. Further, although the image shifting is accomplished by using the piezoelectric device 14 as the actuator to tilt the refracting plate 12 according to the respective embodiments, any other technique which accomplishes image shifting in the same manner may be applied to the moire removal.

As described above, according to the present invention both an image with a first resolution and another image with a second resolution which is higher than the the first resolution and which is obtained by activating the image-shifting means, are acquired. When a moire is detected in the image with the first resolution, the image with the first resolution free from moire can be obtained by activating the moire-removing means. Since the moire-removing means is deactivated when no moire is detected, the power consumption can be reduced.

Also, according to the invention, since the images with a first resolution are not subjected to processing for synthesis of images, they may be processed as dynamic images which are continuous during a short time interval.

Also, according to the invention, since moire detection is based on whether the moire-removing means has been activated or deactivated in response to the image information inputted, moire detection is accomplished rapidly and effectively, a moire-removing operation is performed only when a moire is detected, and thus the power consumption is reduced when no moire is detected.

Also, according to the invention, since the presence or absence of a moire is judged on whether there is a difference between the information of the image with a first resolution and the information of the image with a second resolution, moire detection may be performed rapidly, and the power consumption can be reduced, since the moire-removing means is deactivated when no moire is detected.

Also, according to the invention, since the information of the image with a first resolution is interpolated on a pixel-by-pixel basis so as to ensure the same number of pixels as the information of the image with a second resolution for comparison to judge whether a moire is present or not, moire detection can be performed in a reliable manner, and the power consumption can be reduced by deactivating the moire-removing means when no moire is produced.

Also, according to the invention, since moire detection is performed through extraction of high spatial frequency components from the information of the image with a second resolution, the moire-removing means is activated when a moire is detected, and deactivated when no moire is detected, to produce images with a higher resolution.

Also, according to the invention, since the image information is processed by FFT for comparison of the frequency components to detect a moire, it is easy to change the range of the frequency components, etc. to adjust the conditions for more efficient removal of a moire.

Also, according to the invention, the effect of pausing of the inputted image during operation of the moire-detecting means can be reduced.

Also, according to the invention, a moving vector is operated on the basis of the inputted image information, the moire-removing means is activated to remove a moire when the move is judged to be slight, indicating an obtrusive moire, and thus a high-quality image is produced. Conversely, when the moving vector is larger than a predetermined amount, and thus the moire is judged to be only slightly obtrusive based on the greater move, the moire-removing means is deactivated, resulting in lower power consumption.

Also, according to the invention, movement of the image inputting apparatus is detected, and when the amount of the movement is smaller than a predetermined amount, the moire-removing means is activated to remove a moire and thereby produces a high-quality image. In cases where the amount of the movement is larger than the predetermined amount, the moire is considered to be only slightly obtrusive, and thus the moire-removing means is deactivated to lower the power consumption.

Also, according to the invention, when the dynamic image is an image with greater move, the moire-removing means is deactivated to lower the power consumption.

Also, according to the invention, since the driving period of the image-shifting operation by the image-shifting means is calculated on the basis of the storage time of the solid state imaging device, moire removal can be accomplished effectively.

Also, according to the invention, since the image-shifting means is used and driven with a period which is calculated on the basis of the storage period of the solid state imaging device, and operated in reverse once at the halfway stage of the storage time, moire removal can be performed efficiently to reduce the power consumption required for the moire removal.

Also, according to the invention, since moire removal by image shifting is activated at a frequency matching the resonance frequency of the movable section of the image-shifting means, the power required for driving it is minimized, and thus moire removal can be performed with lower power consumption.

Also, according to the invention, since the distance of image shifting by the image-shifting means matches the pixel pitch of the solid state imaging device, moire removal may be performed effectively without impairing the resolution.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image inputting apparatus including, an optical system for gathering incident light from a subject, a solid state imaging device, and an image shifting device for shifting an optical path incident upon the solid state imaging device, the image shifting device being capable of acquiring a first image with a first resolution limited by a pixel number rating of the solid state imaging device and a second image with a second resolution being higher than the first resolution, the second image being produced by synthesizing a plurality of images resulting from image shifting of predetermined amounts, the image inputting apparatus comprising:
moire-detecting means for detecting the presence or absence of moire distortion based on image information from at least one of said first and second images inputted to the solid state imaging device;
moire-removing means for removing the moire distortion from the at least one inputted image; and
control means for responding to an output of the moire-detecting means, when the first image with the first resolution is inputted, and for activating or deactivating the moire-removing means based on the presence or absence of the moire distortion, respectively.

2. The image inputting apparatus according to claim 1, wherein the first image with the first resolution is a dynamic image.

3. The image inputting apparatus according to claim 1, wherein the moire-detecting means comprises:
comparing means for comparing image information obtained from operation of the moire-removing means and image information obtained from non-operation of the moire-removing means to calculate a difference; and
judging means for providing an output signal indicating the presence of the moire distortion when the calculated difference is larger than a predetermined amount, or the absence of the moire distortion when the calculated difference is smaller than the predetermined amount.

4. The image inputting apparatus according to claim 1, wherein the moire-detecting means comprises:
comparing means for comparing information of the first image with the first resolution and information of the second image with the second resolution to calculate a difference; and
judging means for providing an output signal indicating the presence of the moire distortion when the calculated difference is larger than a predetermined amount, or the absence of the moire distortion when the calculated difference is smaller than the predetermined amount.

5. The image inputting apparatus according to claim 4, wherein the comparing means makes a comparison between low spatial frequency components after the first image with a first resolution is interpolated pixel by pixel to have the same number of pixels as the second image with the second resolution.

6. The image inputting apparatus according to claim 1, wherein the moire-detecting means comprises:
high spatial frequency extracting means for extracting high spatial frequency components from information of the second image with the second resolution; and
judging means for providing an output signal indicating the presence of the moire distortion when the output from the high spatial frequency component extracting means is larger than a predetermined amount, or for providing an output signal indicating the absence of the distortion moire when the output is smaller than the predetermined amount.

7. The image inputting apparatus according to claim 1, 2, 3, 4, 5 or 6, wherein the moire-detecting means includes fast-Fourier transformation processing means for processing the image information by fast Fourier transformation to compare frequency components.

8. The image inputting apparatus according to claim 1, 2, 3, 4, 5, or 6,
wherein the moire-detecting means accesses a photographic scene of the image inputting apparatus, and activates the moire-removing means immediately after switching to another photographic scene.

9. An image inputting apparatus including, an optical system for gathering incident light from a subject, a solid state imaging device, and an image shifting device for shifting an optical path incident upon the solid state imaging device, the image shifting device being capable of acquiring a first image with a first resolution determined by a pixel number rating of the solid state imaging device and a second image with a second resolution being higher than the first resolution, the second image being produced by synthesizing a plurality of images resulting from image shifting of predetermined amounts, the image inputting apparatus comprising:
moving vector-operating means for operating a moving vector based on at least two frames of image information inputted to the solid state imaging device at a predetermined interval;
moire-removing means for removing moire-related image information from the incident image and for controlling the image shifting device to lower a spatial frequency of oscillation of the image; and
control means for cooperating with the moving vector-operating means when the first image with the first resolution is inputted to activate the moire-removing means when the moving vector is smaller than a predetermined amount, or to deactivate the moire-removing means when the moving vector is larger than the predetermined amount.

10. An image inputting apparatus including, an optical system for gathering incident light from a subject, a solid state imaging device, and an image shifting device for shifting an optical path incident upon the solid state imaging device, the image shifting device being capable of acquiring a first image with a first resolution determined by a pixel number rating of the solid state imaging device and a second image with a second resolution being higher than the first resolution, the second image produced by synthesizing a plurality of images resulting from image shifting of predetermined amounts, the image inputting apparatus comprising:

movement-detecting means for detecting movement of the image inputting apparatus;

moire-detecting means for removing moire-related image information from the incident image and for controlling the image shifting device to lower a spatial frequency of oscillation of the image; and control means for responding to an output of the movement-detecting means when the image with a first resolution is inputted, and for activating the moire-removing means when the amount of movement of the image inputting apparatus is smaller than a predetermined amount, or deactivating the moire-removing means when the amount of movement of the image inputting apparatus is larger than the predetermined amount.

11. The image inputting according to claim 9 or claim 10, wherein the image with a first resolution is a dynamic image.

12. The image inputting apparatus according to claim 1, 2, 9 or 10, wherein the moire-removing means accomplishes moire removal by subjecting an optical path incident upon the solid state imaging device to minute, high-speed vibrations through the use of the image-shifting means to lower the spatial frequency of images equally incident upon the solid state imaging device, and operating the image-shifting means in such a manner that the driving period t' of the image-shifting operation satisfies the relationship: $t'=t/2^n$, wherein t is a storage time of the solid state imaging device, and n is an integer of one or more.

13. The image inputting apparatus according to claim 12, wherein the moire-removing means operates the image-shifting means in such a manner that the distance of the image shifting is within the range of 0.25–1 times the pixel pitch of the solid state imaging device in the image-shifting direction.

14. The image inputting apparatus according to claims 1, 2, 9 or 10, wherein the moire-removing means accomplishes moire-removal by subjecting the optical path incident upon the solid state imaging device to minute, high-speed vibrations through the use of the image shifting means to lower the spatial frequency of image equally incident upon the solid state imaging device, and operating the image-shifting means in such a manner that the driving period t' of the image-shifting operation satisfies the relationship: $t'=2t/2^n$ wherein t is the storage period of the solid state imaging device, and n is an integer of one or more, and the image shifting operation is reversed once at the halfway stage of the storage time of the solid state imaging device.

15. The image inputting apparatus according to claim 14, wherein the moire-removing means operates the image-shifting means in such a manner that the distance of the image shifting is within the range of 0.25–1 times the pixel pitch of the solid state imaging device in the image-shifting direction.

16. An image inputting apparatus according to claims 1, 2, 9 or 10, wherein the moire-removing means accomplishes moire removal by subjecting the optical path incident upon the solid state imaging device to minute, high-speed vibrations through the use of the image-shifting means to lower the spatial frequency of image equally incident upon the solid state imaging device, and matching the drive frequency of the image-shifting operation to the resonance frequency of the movable section of the image shifting means.

17. The image inputting apparatus according to claim 16, wherein the moire-removing means operates the image-shifting means in such a manner that the distance of the image shifting is within the range of 0.25–1 times the pixel pitch of the solid state imaging device in the image-shifting direction.

18. The image inputting apparatus according to claim 1 wherein the moire-detecting means includes a moire reducer for transforming unreduced-moire data into reduced-moire data for subsequent comparison to the unreduced-moire data, to produce an output indicative of the presence or absence of moire distortion.

19. The image inputting apparatus according to claim 1 wherein the moire-removing means removes the moire distortion by subjecting the optical path to vibrations through the image-shifting means to lower the spatial frequency of the image incident upon the solid-state imaging device;

the moire-removing means operating the image-shifting means such that the distance of the image shifting is within the range of 0.25 to 1 multiplied by the pixel pitch of the solid-state imaging device in the image-shifting direction; and the image shifting means operating such that the driving period t' of the image-shifting operation satisfies the relationship of $t'=t/2^n$, wherein t is the storage time of the solid-state imaging device, and n is an integer of one or more.

20. The image inputting apparatus according to claim 10 wherein the moire removing means provides a control signal to the image shifting means, and wherein the image shifting means further includes a refractive plate, a piezoelectric device operably coupled to the refractive plate, and a piezoelectric driving circuit driving the piezoelectric device to alter the optical path.

21. A method of inputting image data comprising the steps of:

gathering light from a subject to acquire a first image having a first resolution;

shifting an optical path incident upon a solid state imaging device to capture a plurality of images of the subject;

synthesizing the plurality of images through a correlation function to produce a second image from the plurality of images, the second image having a second resolution higher resolution than the first resolution;

transforming unreduced moire data in any of said images into reduced moire data;

comparing the unreduced moire data to the reduced moire data to detect the presence or absence of moire distortion; and controlling a moire-distortion reducer to remove or reduce the moire data of one of said images if the presence of moire distortion is detected in the comparing step such that moire-distortion reduction occurs, as needed, to improve power consumption.

22. The method according to claim 21 wherein the comparing step further comprises:

calculating a difference between the moire data and the unreduced moire data on a pixel-by-pixel bases to obtain an output datum for each pixel;

evaluating the output data to determine if the output data is greater than or equal to a predetermined threshold to establish the presence of moire distortion.

23. The method according to claim 21 wherein the transforming step includes shifting images to yield reduced moire data through phase cancellation in the image shifting process.

24. The method according to claim 21 wherein the shifting step and the controlling step comprise lowering a spatial frequency of oscillation of an image to reduce moire distortion.

* * * * *